G. M. FREEMAN.
CREAM COLLECTING PUMP.
APPLICATION FILED NOV. 18, 1909.
972,075.
Patented Oct. 4, 1910.
2 SHEETS—SHEET 2.
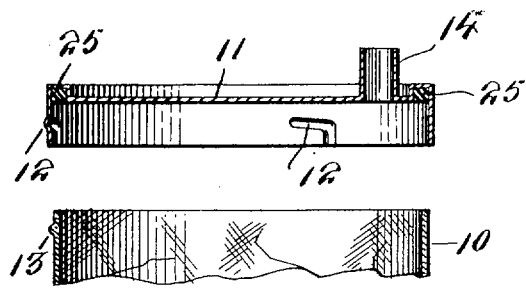
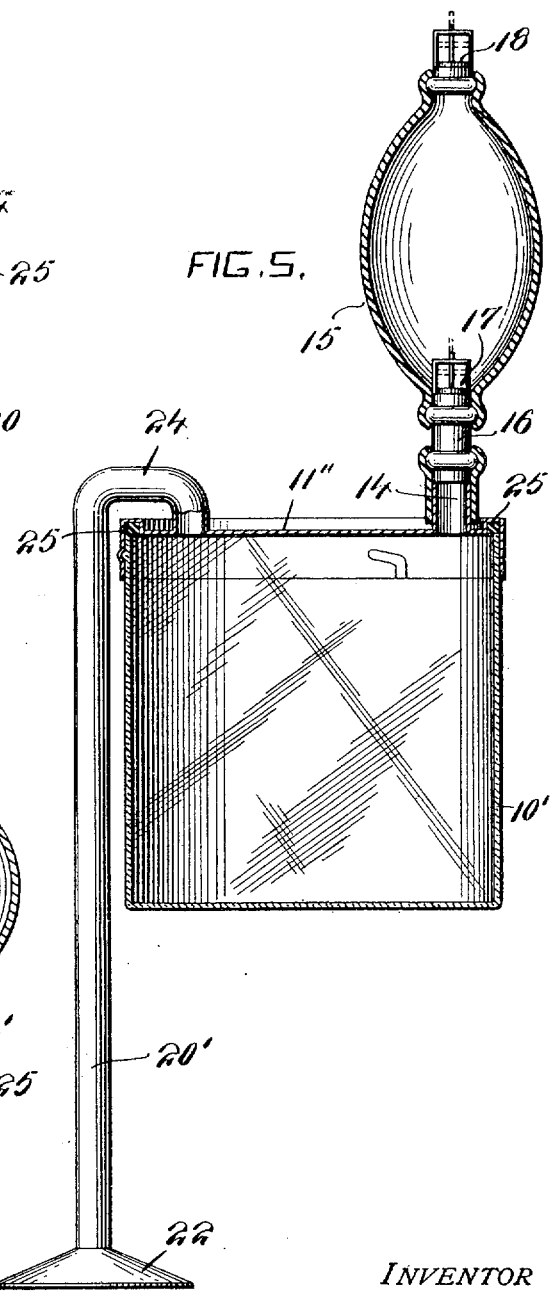
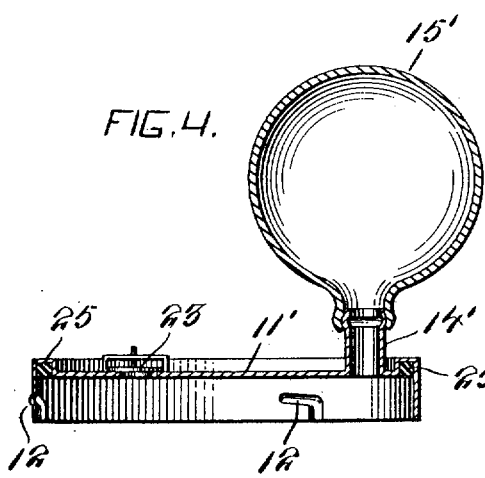
WITNESSES:
INVENTOR
George M. Freeman
BY
Mason Fenwick Lawrence
Attorneys

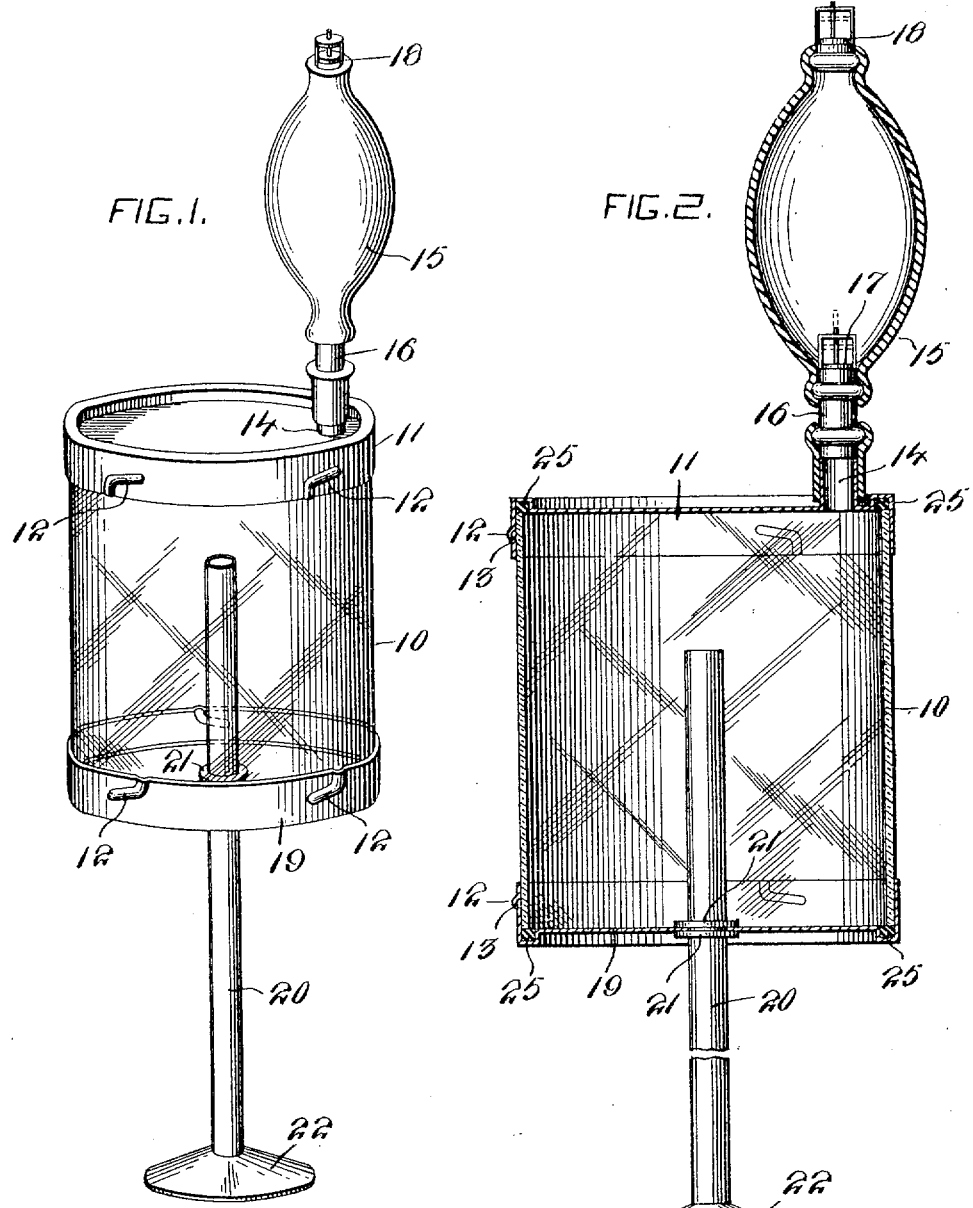

UNITED STATES PATENT OFFICE.

GEORGE M. FREEMAN, OF SEATTLE, WASHINGTON.

CREAM-COLLECTING PUMP.

972,075.  Specification of Letters Patent.  Patented Oct. 4, 1910.

Application filed November 18, 1909. Serial No. 528,793.

*To all whom it may concern:*

Be it known that I, GEORGE M. FREEMAN, a citizen of the United States, residing at Seattle, in the county of King and State of Washington, have invented certain new and useful Improvements in Cream-Collecting Pumps; and I do hereby declare the following to be a full, clear, and exact description of the invention, such as will enable others skilled in the art to which it appertains to make and use the same.

This invention relates to apparatus for removing one liquid from the top of another liquid and more especially for skimming cream from milk under certain conditions.

A further object of the invention is to provide a receptacle with pneumatic means for withdrawing one liquid from another into such receptacle without drawing the liquid into the pneumatic apparatus proper.

The specific object of the invention is to provide an apparatus for removing cream from milk in bottles in which it is ordinarily delivered to city customers and providing a receptacle to contain such removed cream as it is withdrawn from the bottle.

A further object of the invention is to provide a receptacle having a tube extending below the receptacle and communicating therewith and with a bulb or other pneumatic device for producing a rarefaction of air within the receptacle.

With these and other objects in view the present invention comprises certain novel constructions, combinations and arrangements of parts as will be hereinafter fully described and claimed.

In the drawings Figure 1 is a perspective view of the improved apparatus embodying removable heads upon each end of the receptacle: Fig. 2 is a transverse sectional view of the device showing embodiment similar to that shown in Fig. 1. Fig. 3 is a diametrical, sectional view of the cover member or head from one end of the receptacle showing also a fragment of the end of the receptacle adjacent thereto. Fig. 4 is a diametrical, sectional view of a head or cap for the receptacle showing a valve and a valveless bulb. Fig. 5 is a diametrical, sectional view of an embodiment of the invention having an inlet pipe communicating at the top of the receptacle instead of through the bottom.

Like characters of reference designate like parts throughout the several views.

As shown in Figs. 1, 2 and 3, the receptacle 10, preferably of glass for convenience, is in the form of a cylinder open at both ends with a cover member 11 for the top which is secured on the top by means of bayonet joints comprising the grooves 12 struck up in the metal of the cap to produce ridges or ribs upon the outer surface and with corresponding lugs 13 outstanding from the material of the cylinder 10 and with which the grooves 12 engage. The cover member 11 is also provided with a nipple 14 upon which is secured a bulb 15 in any approved manner, shown in Figs. 1 and 2, as by means of a union 16, such union being provided with a valve 17 at its upper end adapted to permit air to pass through the nipple into the bulb 15 and also with a valve 18 carried by the upper end of the bulb 15 adapted to permit the outflow of air from such bulb.

At the bottom of the cylinder 10 a cap or head 19 is provided having bayonet joints 12 as previously described and similar to the cap 11 except that a tube 20 is inserted through such cap and extends upwardly within the cylinder and is made air and liquid tight with the cap 19 in any approved manner, as by the collars or nuts 21. At its lower end the tube 20 carries a bell or funnel shaped member 22 so that the liquid lifted through the pipe 20 by atmospheric pressure is not disturbed at its intake as if taken in through the pipe 20 without enlargement.

Instead of employing the valves 17 and 18 as shown in Figs. 1 and 2 the valve 23 may be located in the cover member 11′ and the bulb 15′ without a valve connected with the cylinder by means of the nipple 14′. It is also found desirable under some conditions to have the receptacle formed with an integral bottom as shown at 10′ in Fig. 5. In this embodiment the cover member 11″ is connected with a tube 20′ having a return bend 24 communicating with the receptacle through the cap 11″ the bulb 15, valves 17 and 18 and other associated parts being the same as shown in Figs. 1 and 2. In the embodiment shown in Fig. 5 the cream or other liquid is drawn upwardly through the pipe 20′ and discharged into the top of the receptacle 10′. Whatever the embodiment, it is found desirable to supply a gasket 25 within the annular groove at the outer edge of the cover members which gasket is of elastic material and is bound firmly against the ends of the cylinder by means of the wedging action of the bayonet joints 12.

In operation the bulb 15 or 15' will be deflated by compression and the bell 22 lowered into the liquid to be removed. The release of the bulb 15 or 15' will partially exhaust the receptacle 10 or 10' and the atmospheric pressure on the surface of the liquid will force the liquid upwardly through the pipe 20 or 20' into the receptacle. In the embodiment as shown in Figs. 1, 2 and 5 the bulb may be readily compressed and relaxed during the operation of withdrawing the liquid for the reason that the valve 17 prevents the return of air into the receptacle 10 and the release of the bulb continuously exhausts the air from such receptacle.

I claim:

In a device of the class described, a body, a bottom removable from the body, an inlet tube carried by and removable with the bottom, a cover and air exhausting means carried by and removable with the cover.

In testimony whereof I affix my signature in presence of two witnesses.

GEORGE M. FREEMAN.

Witnesses:
G. WARD KEMP,
C. C. PHILLIPS.